US012478549B2

(12) United States Patent
Woo

(10) Patent No.: US 12,478,549 B2
(45) Date of Patent: Nov. 25, 2025

(54) NON-CONTACT ULTRASONIC SKINCARE DEVICE HAVING LED LIGHT IRRADIATION AND MIST SPRAY FUNCTIONS

(71) Applicant: COIZ Co., Ltd., Seoul (KR)

(72) Inventor: Jae-Hyun Woo, Seoul (KR)

(73) Assignee: COIZ Co., Ltd., Seoul (KR)

( * ) Notice: Subject to any disclaimer, the term of this patent is extended or adjusted under 35 U.S.C. 154(b) by 427 days.

(21) Appl. No.: 17/989,472

(22) Filed: Nov. 17, 2022

(65) Prior Publication Data

US 2023/0165752 A1 Jun. 1, 2023

(30) Foreign Application Priority Data

Dec. 1, 2021 (KR) ........................ 10-2021-0169878

(51) Int. Cl.
*A61H 33/12* (2006.01)
*A45D 1/00* (2006.01)
*A61H 35/00* (2006.01)

(52) U.S. Cl.
CPC ........... *A61H 33/12* (2013.01); *A61H 35/008* (2013.01); *A45D 2001/008* (2013.01); *A45D 2200/057* (2013.01)

(58) Field of Classification Search
CPC ........ A45D 2001/008; A45D 2200/057; A45D 2200/205; A61N 7/00; A61N 2005/0642; A61N 2005/0647; A61N 2005/0653; A61N 2007/0034; A61H 33/12; A61H 35/008
USPC .............................................................. 4/537
See application file for complete search history.

(56) References Cited

U.S. PATENT DOCUMENTS 8,192,473 B2 6/2012 Tucker et al. .................. 607/91
2020/0030638 A1* 1/2020 Chamanzar .............. A61N 7/00

FOREIGN PATENT DOCUMENTS

KR 10-2012-0009571 A 2/2012
KR 10-2018-0134624 A 12/2018
KR 10-1946271 B1 2/2019
KR 10-2021-0009262 A 1/2021
KR 10-2021-0009474 A 1/2021
KR 10-2021-0035709 A 4/2021
KR 10-2021-0035711 A 4/2021
(Continued)

OTHER PUBLICATIONS

Japanese Office Action mailed Oct. 3, 2023, issued to Japanese Application No. 2022-189381.
(Continued)

*Primary Examiner* — Tuan N Nguyen
(74) *Attorney, Agent, or Firm* — PnK IP LLC

(57) ABSTRACT

Disclosed is a non-contact ultrasonic skincare device having LED light irradiation and mist spraying functions. The device includes a dome mask in a form of a hemisphere; an LED power source installed on an inner ceiling face of the dome mask; an ultrasonic oscillator installed on the inner ceiling face of the dome mask; a spray nozzle installed on the inner ceiling face of the dome mask so as to spray a cosmetic stored in a storage tank into the inner space in a form of mists as fine particles; and a power supply for supplying power to each of the LED power source, the ultrasonic oscillator, and the spray nozzle; and a controller configured to control an operation of each of the LED power source, the ultrasonic oscillator, and the spray nozzle.

8 Claims, 3 Drawing Sheets

(56) References Cited

FOREIGN PATENT DOCUMENTS

| | | | |
|---|---|---|---|
| KR | 10-2021-0126835 | A | 10/2021 |
| WO | WO 2020/085727 | A1 | 4/2020 |

OTHER PUBLICATIONS

Office Action issued on Nov. 20, 2023 to Korean Application No. 10-2021-0169878.
Extended European Search Report mailed Apr. 12, 2023, issued to counterpart European Application No. 22210488.7.

* cited by examiner

NON-CONTACT ULTRASONIC SKINCARE DEVICE HAVING LED LIGHT IRRADIATION AND MIST SPRAY FUNCTIONS

CROSS-REFERENCE TO RELATED APPLICATION

This application claims priority to and the benefit of Korean Patent Application No. 10-2021-0169878 filed in the Korean Intellectual Property Office on Dec. 1, 2021, the entire contents of which are incorporated herein by reference.

BACKGROUND

Field

The present disclosure relates to a non-contact ultrasonic skincare device having LED light irradiation and mist spray functions. More specifically, the present disclosure relates to a non-contact ultrasonic skincare device having LED light irradiation and mist spray functions in which Rayleigh scattering of light is converted to Mie scattering of light using an ultrasonic wave so that cosmetic-containing mist solution can effectively permeate a facial skin to increase penetration of light energy and the mist solution into the skin, and help to remove residual foreign substances on a skin surface.

Description of Related Art

Currently, a technology for improving skin beauty or treating skin by irradiating light to the skin has been developed, and related products are being released.

For example, Korean Patent Application Publication No. 10-2018-0134624 titled as "A face mask having a multi-wavelength power source" provides a face mask having an LED power source irradiating light of various wavelengths to be used for skin care.

When LED light is used for skin treatment, the LED light may be used in various fields such as wound healing, acne healing, and skin recovery. For example, Korean Patent Application Publication No. 10-2012-0009571 titled as "A system and method for treating a skin using LED" discloses a device for treating the skin using the LED light.

In this way, skin beauty or skin treatment may be achieved using the light emitted from a power source such as LED. In this case, heat is generated due to the emitted light. Thus, a problem of cooling the heat arises.

Conventionally, in the skin treatment with the LED light, a ceramic material is brought into contact with the skin to cool the skin, which is very inconvenient.

Therefore, there is a demand for a method capable of cooling the skin comfortably and stably in a non-contact manner with the skin while performing the skin care or skin treatment with light irradiation such as the LED light.

Further, there is a demand for a scheme to be able to supply good ingredients for skin improvement, such as cosmetic ingredients or drugs, required for skin along with cooling the skin while irradiating the LED light.

PRIOR ART LITERATURE

Patent Literature

Patent Document 1: Korean Patent Application Publication No. 10-2018-0134624 titled as "A face mask having a multi-wavelength power source"

Patent Document 2: Korean Patent Application Publication No. 10-2012-0009571 titled as "A system and method for treating a skin using LED"

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a non-contact ultrasonic skincare device having LED light irradiation and mist spray functions in which ultrasonic waves are applied into a dome mask space such that Rayleigh scattering of light irradiated from the LED power source is converted to Mie scattering thereof using the ultrasonic wave to increase straightness of the light.

In addition, another purpose of the present disclosure is to provide a non-contact ultrasonic skincare device having LED light irradiation and mist spray functions in which the ultrasonic waves are applied to the facial skin such that foreign substances remaining on pores or an outer surface of the skin are removed therefrom.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

An aspect of the present disclosure provides a non-contact ultrasonic skincare device having LED light irradiation and mist spraying functions, the device comprising: a dome mask in a form of a hemisphere, wherein one side thereof is partially open, and an inner space is defined by the dome mask; an LED power source installed on an inner ceiling face of the dome mask so as to emit light into the inner space; an ultrasonic oscillator installed on the inner ceiling face of the dome mask so as to generate ultrasonic waves and apply the generated ultrasonic waves into the inner space; a spray nozzle installed on the inner ceiling face of the dome mask so as to spray a cosmetic stored in a storage tank into the inner space in a form of mists as fine particles; and a power supply for supplying power to each of the LED power source, the ultrasonic oscillator, and the spray nozzle; and a controller configured to control an operation of each of the LED power source, the ultrasonic oscillator, and the spray nozzle, wherein the cosmetic is effectively absorbed into a face of a user received in the inner space using the light irradiated from the LED power source and the ultrasonic waves applied from the ultrasonic oscillator.

In one implementation of the non-contact ultrasonic skincare device, the ultrasonic wave applied from the ultrasonic oscillator increases scattering of the mist sprayed and the light irradiated into the inner space defined by the dome mask, and allows foreign substances remaining on the user's facial skin to be removed therefrom, wherein the scattering of the light irradiated from the LED power source is converted from Rayleigh scattering to Mie scattering system, such that an amount of light energy reaching the user's face becomes relatively larger.

In one implementation of the non-contact ultrasonic skincare device, an orientation angle of each of the LED power source, the ultrasonic oscillator, and the spray nozzle with respect to the inner ceiling face of the dome mask is adjustable.

In one implementation of the non-contact ultrasonic skincare device, the cosmetic includes an oxygen dissolved solution in which oxygen is dissolved.

According to the present disclosure, the ultrasonic waves are applied into a dome mask space such that Rayleigh scattering of light irradiated from the LED power source is converted to Mie scattering thereof using the ultrasonic wave to increase straightness of the light and thus, the light effective for skin care may be transmitted to the face skin effectively.

In addition, according to the present disclosure, the ultrasonic waves are applied to the facial skin such that foreign substances remaining on pores or an outer surface of the skin are removed therefrom.

In addition to the effects as described above, specific effects in accordance with the present disclosure will be described together with following detailed descriptions for carrying out the disclosure.

DETAILED DESCRIPTIONS

Figure 1:
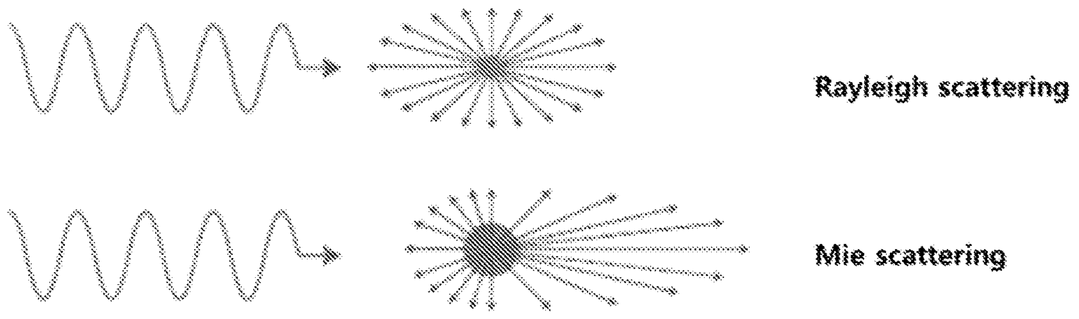
FIG. 1 is a diagram illustrating two types of light scattering.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms “a” and “an” are intended to include the plural forms as well, unless the context clearly indicates otherwise. It will be further understood that the terms “comprises”, “comprising”, “includes”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of the associated listed items. Expression such as “at least one of” when preceding a list of elements may modify an entirety of list of elements and may not modify the individual elements of the list. When referring to “C to D”, this means C inclusive to D inclusive unless otherwise specified.

In addition, it will also be understood that when a first element or layer is referred to as being present “on” or “beneath” a second element or layer, the first element may be disposed directly on or beneath the second element or may be disposed indirectly on or beneath the second element with a third element or layer being disposed between the first and second elements or layers. It will be understood that when an element or layer is referred to as being “connected to”, or “coupled to” another element or layer, it may be directly on, connected to, or coupled to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

Further, as used herein, when a layer, film, region, plate, or the like may be disposed “on” or “on a top” of another layer, film, region, plate, or the like, the former may directly contact the latter or still another layer, film, region, plate, or the like may be disposed between the former and the latter. As used herein, when a layer, film, region, plate, or the like is directly disposed “on” or “on a top” of another layer, film, region, plate, or the like, the former directly contacts the latter and still another layer, film, region, plate, or the like is not disposed between the former and the latter. Further, as used herein, when a layer, film, region, plate, or the like may be disposed “below” or “under” another layer, film, region, plate, or the like, the former may directly contact the latter or still another layer, film, region, plate, or the like may be disposed between the former and the latter. As used herein, when a layer, film, region, plate, or the like is directly disposed “below” or “under” another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Hereinafter, with reference to the drawings, a non-contact ultrasonic skincare device having LED light irradiation and mist spray functions (hereinafter referred to as a 'skincare device') according to an embodiment of the present disclosure will be described.

Figure 2:
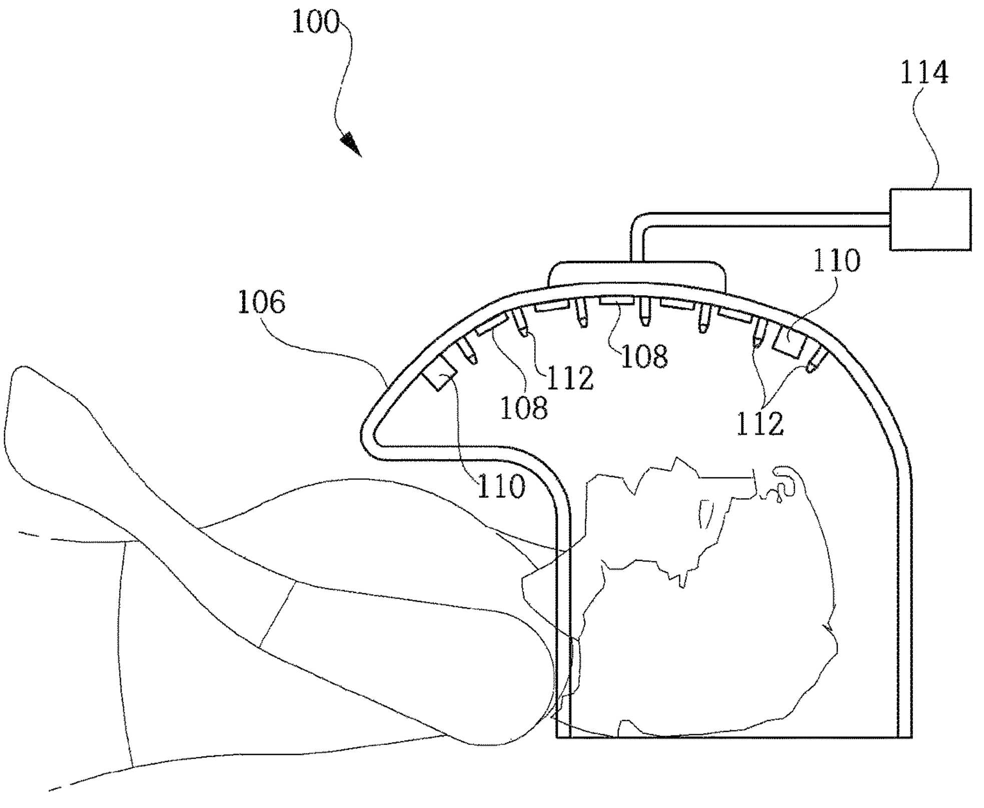
FIG. 2 is a cross-sectional view showing a structure of a skincare device according to the present disclosure.
Figure 3:
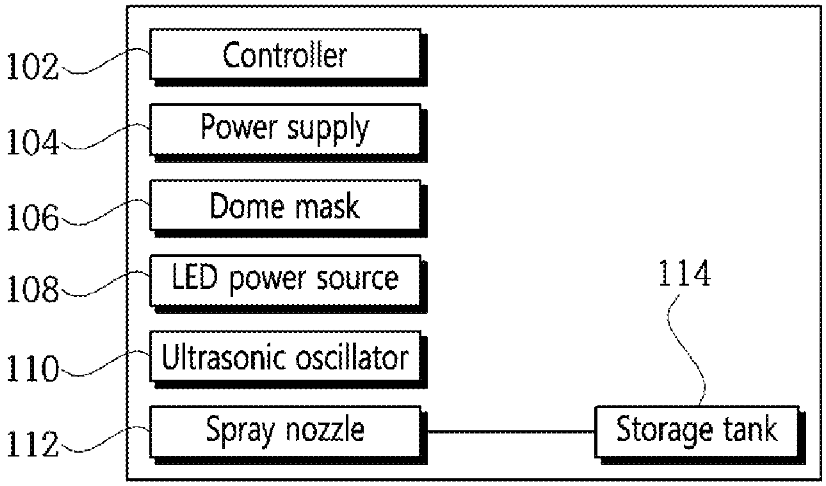
FIG. 3 is a block diagram showing components of the skincare device.
Figure 4:
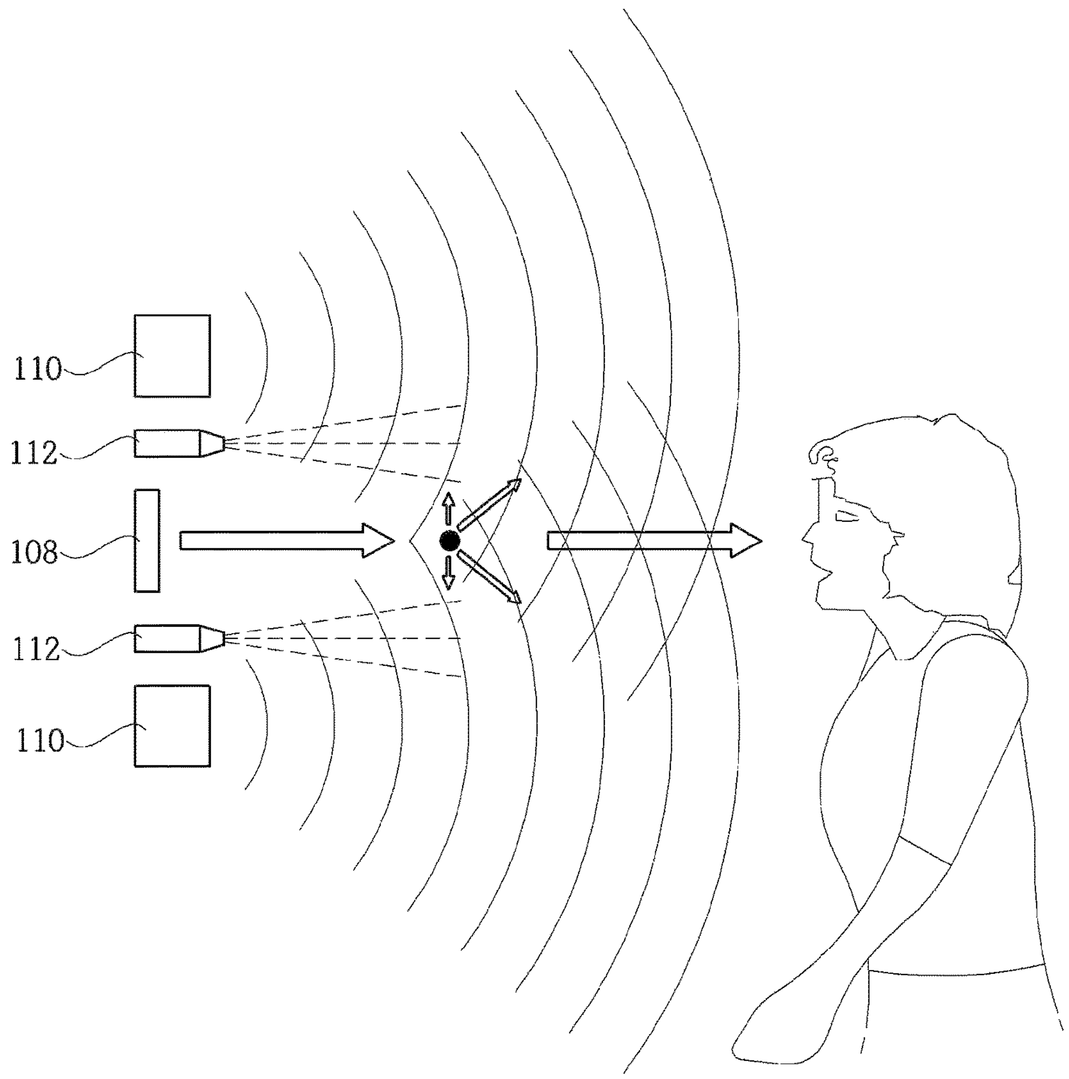
FIG. 4 is a conceptual diagram showing an environment in which light reaches a face.

FIG. 1 is a diagram illustrating two types of light scattering. FIG. 2 is a cross-sectional view showing a structure of a skincare device according to the present disclosure. FIG. 3 is a block diagram showing components of the skincare device. FIG. 4 is a conceptual diagram showing an environment in which light reaches a face.

A skincare device 100 according to the present disclosure is configured to perform skin care by applying light, ultrasonic waves, and mist on the skin of the face of the user while the face of the user is received inside a certain space. In general, the user puts her/his face in a mask-type device such that the mist comes into contact with the skin thereof while the face is exposed to light. In accordance with the present disclosure, the device is configured such that the mask faces downwardly the user's face so that the sprayed mist may reach the user's face effectively.

As light travels straight through the air, it collides with particles, causing refraction or scattering thereof. The light scattering occurs in two major ways: Rayleigh scattering and Mie scattering, depending on the wavelength of the light traveling straight ahead and a size of the colliding particles.

When the size of the particles in the space in which light travels is smaller than the wavelength of light (a molecular state), Rayleigh scattering occurs. When the size of the particles in the space in which light travels is larger than the wavelength of light (a fog or soot state), Mie scattering occurs.

It seems like that when the scattering occurs, light is reflected from an object and thus a viewer located in the opposite direction to the light traveling direction views the reflected light at a strong level. However, actually, the scattering occurs largely in the same direction as the light traveling direction. Further, the scattering direction depends on the size of the particle.

As the particle size becomes smaller, the scattering occurs in the backward direction. When the particle size is about 0.05 μm, the intensity of the light scattered in the forward direction and the intensity of the light scattered in the opposite direction become similar to each other.

The intensity of Rayleigh scattering is inversely proportional to the fourth power of the wavelength. Therefore, the shorter the wavelength, the greater the scattering. Thus, the blue light (400 nm) scatters 9 times better than the red light (700 nm) scatters. In this way, the sky color is blue.

In accordance with the present disclosure, Rayleigh scattering occurring when the light is colliding with air particles is converted into Mie scattering using the ultrasonic waves, such that the light from the LED source can more effectively contact the facial skin.

To this end, the device according to the present disclosure has a dome mask 106 in a form of a hemisphere, and one side of the dome mask 106 is partially open. Through this side opening, the user's face may be input inside the dome mask 106.

The dome mask 106 is preferably made of an opaque material, or may be made of a translucent or transparent material. The dome mask 106 is preferably made of a plastic material.

A controller 102 is installed in the skincare device 100 to control operations of the components thereof. The controller 102 may be installed on one side of the dome mask 106, or may be configured as a separate unit connected to the device 100 via a cable, etc. The controller 102 may be provided with control means in a form of a touch-type button or a touch-type display.

Further, a power supply 104 supplies power for an operation of injection means or light emitting means. The power supply may be embodied as a commercial power source connected to an outlet at home, or as a portable power supply using a rechargeable battery.

Means for generating the light, means for generating the ultrasonic waves, and means for generating the mist are disposed on an inner face of the dome mask 106. A face of the user may face upwardly while the user is lying. Thus, it is preferable to install the means for generating the light, the means for generating the ultrasonic waves, and the means for generating the mist on an inner ceiling face of the dome mask 106 in the form of the hemisphere.

In accordance with the present disclosure, a LED power source 108, an ultrasonic oscillator 110, and a spray nozzle 112 are installed on the inner ceiling face of the dome mask 106. These components may be installed in a separate manner from each other in a separate location from each other. However, the present disclosure is not limited thereto. It is preferable that a plurality of LED power sources 108, a plurality of ultrasonic oscillators 110, and a plurality of spray nozzles 112 may be arranged in a mixed manner in order to generate the effects of the components uniformly.

The LED power source 108 refer to means for emitting light of a certain wavelength. The skin beauty or treatment effect may vary according to the wavelengths of the light emitted from these LED power sources 108.

When oxygen is supplied to the skin while light is irradiated to the skin from the power source such as an LED, the oxygen is excited to bring about a disinfecting effect that removes bacteria and the like, thereby making it possible to make clean skin.

In accordance with the present disclosure, the LED power sources 108 may emit light beams of blue, red and near infrared wavelengths. The LED power sources 108 may emit blue and red light beams to emit violet light as a mixture of these light beams. The cosmetic or therapeutic effect may vary according to the wavelengths of light.

In this embodiment, a plurality of the LED power sources 108 may be provided, and may be installed adjacent to the spray nozzles 112. The plurality of LED power sources 108 generally radiate light toward the user's face. However, if necessary, some of the LED power sources 108 may be installed so as to radiate light toward the user's scalp.

The ultrasonic oscillator 110 generates the ultrasonic waves and applies the generated ultrasonic waves toward the user's face or scalp. Further, the ultrasonic wave causes the mist particles injected into an inner space defined by the dome mask 106 to merge with each other such that the mist particle size increases. This causes the Rayleigh scattering of the light to be converted to the Mie scattering of the light. That is, the change in the particle size caused by the application of the ultrasonic wave changes the scattering of light from the Rayleigh scattering to the Mie scattering of the light. Thus, the light irradiated from the LED power source 108 may travel in a straighter manner and may reach the user's skin more intensively.

The ultrasonic waves pass through or reflect from a medium depending on characteristics of the medium. When a frequency of the ultrasonic wave and a natural frequency of the medium are similar to each other, the ultrasonic waves may transfer energy to the medium. In the air, the ultrasonic waves are transmitted at little loss. However, in a presence of a space, the ultrasonic wave is reflected therefrom and returned.

Further, when the ultrasonic waves are applied to the user's skin, vibration may be applied to foreign substances remaining on the skin surface or pores. Thus, the foreign substances may be more easily removed from the skin, thereby increasing the cleansing effect.

The spray nozzle 112 of a nebulizer type changes the liquid mist into fine particles with a size of 1 mm to 5 mm and sprays the fine particles to the face skin of the user. The sprayed mist may spread through the inner space defined by the dome mask 106, and then fall downward by gravity and may reach the user's face and scalp. The spray nozzle 112 may be connected to a storage tank 114 via a pipe, and the pipe may further include a pump or a compressor. The controller controls an operation of the pump or the compressor so that an controlled amount of the mist is sprayed through the spray nozzle 112 at the right time.

Cosmetic stored in the storage tank 114 and then sprayed in a form of mist through the spray nozzle 112 may be a solution containing ingredients good for the skin. For example, a cosmetic solution, an oxygen-dissolved solution, or a solution containing ingredients (for example, herbal medicines, etc.) necessary for skin beauty, activity, or treatment may be provided.

In particular, when the dissolved oxygen solution is provided, an oxygen component comes into contact with the user's skin in a form of mist. In this case, while the heat generated in the skin by means such as the LED light source 108 is cooled by the dissolved oxygen solution, the oxygen is supplied to the skin at the same time.

As described above, according to the present disclosure, as the LED power source 108 irradiates the light, the ultrasonic waves are generated and applied, and, at the same time, the mist is sprayed, thereby obtaining a complex effect onto the user's face. The sprayed mist as the fine particles collides with the light irradiated from the LED power source 108 to scatter the light. In this regard, in an absence of the mist particles, light spreads in an isotropic direction while being scattered according to the Rayleigh scattering system. However, under the presence of relatively large particles, the light may scatter according to the Mie scattering system such that most of the light beams may be transmitted in the travel direction of an initial light beam. Thus, a significant amount of light energy can reach the user's face.

In one example, it is necessary to adjust light irradiation, ultrasonic oscillation, and a mist spray angle so that energy transfer is maximized according to the size, the position, and the shape of the user's face. Thus, according to the present disclosure, the LED power source 108, the ultrasonic oscillator 110, and the spray nozzle 112 may be attached to the inner ceiling face of the dome mask 106 such that an angle of each of the LED power source 108, the ultrasonic oscillator 110, and the spray nozzle 112 is adjustable. The user may adjust the angle of each of the LED power source 108, the ultrasonic oscillator 110, and the spray nozzle 112 one by based on the external characteristics of the face. In some cases, the device may be equipped with motorized angle adjustment means such that the controller 102 adjusts the angle of each of the individual components. In this case, the device may further include a scanner that recognizes the appearance of the user's face in a three dimensional manner such that each of the LED power source 108, the ultrasonic oscillator 110, and the spray nozzle 112 is oriented such that the orientation angle thereof becomes an angle closest to a direction normal to the face surface.

Although a preferred embodiment of the present disclosure has been described above with reference to the accompanying drawings, the technical configuration of the present disclosure as described above may be implemented in other specific forms by those skilled in the art to which the present disclosure belongs without changing the technical idea or essential characteristics of the present disclosure. Therefore, the embodiments as described above are to be understood as illustrative and not restrictive in all respects. The scope of the present disclosure is indicated by the claims to be described later rather than the above detailed description, and all changes or modified forms derived from the meaning and scope of the claims and their equivalent concepts are included in the scope of the present disclosure.

What is claimed is:

1. A non-contact ultrasonic skincare device having LED light irradiation and mist spraying functions, the device comprising:

- a dome mask in a form of a hemisphere, wherein one side thereof is partially open, and an inner space is defined by the dome mask;
- an LED power source installed on an inner ceiling face of the dome mask so as to emit light into the inner space;
- an ultrasonic oscillator installed on the inner ceiling face of the dome mask so as to generate ultrasonic waves and apply the generated ultrasonic waves into the inner space;
- a spray nozzle installed on the inner ceiling face of the dome mask so as to spray a cosmetic stored in a storage tank into the inner space in a form of mists as fine particles;
- a scanner that recognizes an appearance of a face of a user in a three dimensional manner;
- a power supply for supplying power to each of the LED power source, the ultrasonic oscillator, and the spray nozzle; and
- a controller configured to control an operation of each of the LED power source, the ultrasonic oscillator, and the spray nozzle,
- wherein the cosmetic is effectively absorbed into the face of the user received in the inner space using the light irradiated from the LED power source and the ultrasonic waves applied from the ultrasonic oscillator.

2. The non-contact ultrasonic skincare device of claim 1, wherein the ultrasonic wave applied from the ultrasonic oscillator increases scattering of the mist sprayed and the light irradiated into the inner space defined by the dome mask, and allows foreign substances remaining on the user's facial skin to be removed therefrom, wherein the scattering of the light irradiated from the LED power source is converted from Rayleigh scattering to Mie scattering system, such that an amount of light energy reaching the user's face becomes relatively larger.

3. The non-contact ultrasonic skincare device of claim 1, wherein the cosmetic includes an oxygen dissolved solution in which oxygen is dissolved.

4. The non-contact ultrasonic skincare device of claim 1, wherein the scanner recognizes the appearance of the face of the user in the three dimensional manner such that each of the LED power source, the ultrasonic oscillator, and the spray nozzle have an orientation angle thereof that becomes an angle closest to a direction normal to a surface of the face of the user.

5. The non-contact ultrasonic skincare device of claim 1, wherein the power supply is in the form of a portable power supply having a rechargeable battery.

6. The non-contact ultrasonic skincare device of claim 1, further comprising a motorized angle adjustment mechanism connected to the controller.

7. The non-contact ultrasonic skincare device of claim 6, wherein the motorized angle adjustment mechanism is configured to adjust an orientation angle of the LED power source, the ultrasonic oscillator, and the spray nozzle.

8. A non-contact ultrasonic skincare device having LED light irradiation and mist spraying functions, the device comprising:

a dome mask in a form of a hemisphere, wherein one side thereof is partially open, and an inner space is defined by the dome mask;

an LED power source installed on an inner ceiling face of the dome mask so as to emit light into the inner space;

an ultrasonic oscillator installed on the inner ceiling face of the dome mask so as to generate ultrasonic waves and apply the generated ultrasonic waves into the inner space;

a spray nozzle installed on the inner ceiling face of the dome mask so as to spray a cosmetic stored in a storage tank into the inner space in a form of mists as fine particles; and a power supply for supplying power to each of the LED power source, the ultrasonic oscillator, and the spray nozzle; and a controller configured to control an operation of each of the LED power source, the ultrasonic oscillator, and the spray nozzle, wherein the cosmetic is effectively absorbed into a face of a user received in the inner space using the light irradiated from the LED power source and the ultrasonic waves applied from the ultrasonic oscillator, wherein the ultrasonic wave applied from the ultrasonic oscillator increases scattering of the mist sprayed and the light irradiated into the inner space defined by the dome mask, and allows foreign substances remaining on the user's facial skin to be removed therefrom, wherein the scattering of the light irradiated from the LED power source is converted from Rayleigh scattering to Mie scattering system, such that an amount of light energy reaching the user's face becomes relatively larger, and wherein an orientation angle of each of the LED power source, the ultrasonic oscillator, and the spray nozzle with respect to the inner ceiling face of the dome mask is adjustable.

* * * * *